Oct. 30, 1928.
O. LEONHARDT
1,689,553
PAPER CARD BOARD AND PASTEBOARD MAKING MACHINE
Filed Dec. 30, 1926
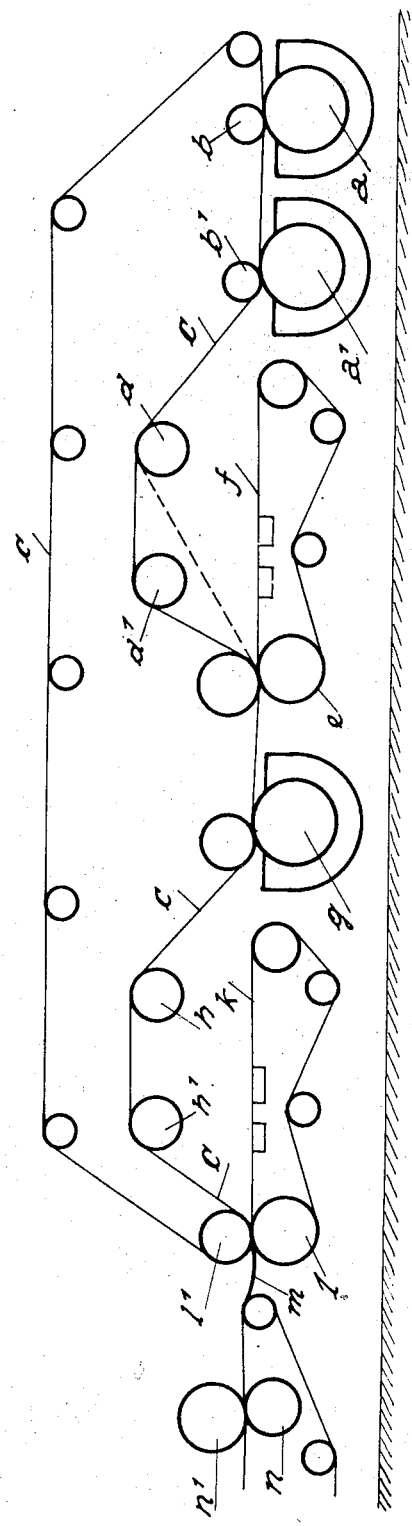

Patented Oct. 30, 1928.

1,689,553

UNITED STATES PATENT OFFICE.

OTTO LEONHARDT, OF CROSSEN, GERMANY.

PAPER, CARDBOARD, AND PASTEBOARD MAKING MACHINE.

Application filed December 30, 1926, Serial No. 158,073, and in Germany August 7, 1925.

At the manufacturing of paper or cardboard couched together of several layers on long-sieve paper machines or on combined long-sieve or round-sieve machines one has hitherto proceeded in such a manner that the long-sieve or round- and long-sieve elements required for producing the individual layers were built stage-wise the one above the other, the layers produced on the elements being subsequently conducted together on one of the stays. This manner of the arrangement of the individual sieve-elements is not easy to observe, requires many attendants and renders the manufacturing difficult. It was hitherto not possible to build all the sieve elements up in one plane as it seemed to be impossible to transfer the wet paper layers over conveying rollers so that the paper sheet does not come in contact with the roller, and in this case the paper sheet stuck more or less on the roller.

This invention has for its object to avoid this inconvenience by couching the paper layers from the several sieve elements for instance onto a fabric passing over all the sieve elements and conducted by means of guide rollers, covered with a coating impermeable to water, over the next following sieve element in such a manner that the wet paper layer hanging on the felt gets onto said guide rollers without sticking on the same, this being possible as the guide rollers are arranged so that the water can pass through and run off the same.

An embodiment of the invention is shown, by way of example, in the only figure of the accompanying drawing in a diagrammatical side elevation.

As shown in the drawing the paper layers received by the round sieve cylinders $a$, $a'$ are couched by the couching rollers $b$, $b'$ to an endless felt $c$ running over all sieve elements and conveyed by guide rollers $d$, $d'$ or only by one of such rollers to the next following long sieve element $f$ to be couched together with the paper layer produced on this long-sieve element. The guide rollers have layers of felt permeable to water in order that the paper layer does not stick on said guide rollers. The felt $c$ carrying the three paper layers couched together passes them over the round-sieve cylinder $g$ to take up the fourth layer of paper. The felt $c$ is then transferred again by the rollers $h$, $h'$ to the long-sieve $k$ and through between the couching rollers $l$, $l'$ of the same so that the paper layer produced on this long-sieve is united with the paper layers taken by the felt $c$ from the preceding sieve elements, said united paper layers being then conveyed, in the well known manner, by the pressing rollers $n$, $n'$ to the drying apparatus.

The transfer mechanism described might be utilized also for other purposes of the paper making.

I claim:—

An arrangement for the manufacturing of paper, cardboard or pasteboard couched together from several layers of paper, comprising in combination with the round-sieve cylinders the couching rollers and the long-sieve elements, an endless felt for successively taking the paper layers prepared on the several sieve-elements from these sieve elements to unite the paper layers from the preceding sieve elements with the paper layer prepared on the next following sieve elements, guide-rollers for guiding said felt, and covers of said guide-rollers of a material permeable to water so that the paper layers on said felt come in contact with said cover.

In testimony whereof I affix my signature.

OTTO LEONHARDT.